(12) United States Patent  (10) Patent No.: US 8,255,555 B2
Takemura et al.  (45) Date of Patent: Aug. 28, 2012

(54) RECEPTION APPARATUS AND METHOD FOR REDUCING TIME DELAY IN CHANNEL SWITCHING

(75) Inventors: Tomoaki Takemura, Tokyo (JP); Yoshikatsu Niwa, Kanagawa (JP); Shinya Masunaga, Tokyo (JP); Tsunemitsu Takase, Tokyo (JP); Junichi Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 12/575,194

(22) Filed: Oct. 7, 2009

(65) Prior Publication Data

US 2010/0088426 A1  Apr. 8, 2010

(30) Foreign Application Priority Data

Oct. 8, 2008  (JP) ................ P2008-262004

(51) Int. Cl.
*G06F 15/16* (2006.01)
(52) U.S. Cl. ........................................ 709/231; 709/232
(58) Field of Classification Search .................. 709/231, 709/232
See application file for complete search history.

(56) References Cited

U.S. PATENT DOCUMENTS

| 7,793,329 | B2* | 9/2010 | Joshi et al. ............ 725/120 |
| 2002/0118659 | A1* | 8/2002 | Sakoda et al. ........... 370/329 |
| 2002/0133741 | A1* | 9/2002 | Maeda et al. ............... 714/7 |
| 2005/0210395 | A1* | 9/2005 | Wakita et al. ............. 715/753 |
| 2005/0283819 | A1* | 12/2005 | Shimoji et al. ............ 725/142 |
| 2006/0156359 | A1* | 7/2006 | Kuwabara et al. ......... 725/100 |
| 2007/0116130 | A1* | 5/2007 | Koizumi et al. ...... 375/240.26 |
| 2007/0250890 | A1* | 10/2007 | Joshi et al. .............. 725/120 |
| 2008/0013555 | A1* | 1/2008 | Kamimaki et al. ........ 370/401 |
| 2009/0222873 | A1* | 9/2009 | Einarsson .................. 725/115 |

FOREIGN PATENT DOCUMENTS

| JP | 2003-143587 | 5/2003 |
| JP | 2005-86222 | 3/2005 |
| JP | 2007-124177 | 5/2007 |
| JP | 2007-215069 | 8/2007 |
| JP | 2008-022393 | 1/2008 |
| JP | 2009-17064 | 1/2009 |
| JP | 2009-258607 | 11/2009 |

* cited by examiner

*Primary Examiner* — Peter-Anthony Pappas
*Assistant Examiner* — Umar Cheema
(74) *Attorney, Agent, or Firm* — Finnegan, Henderson, Farabow, Garrett & Dunner, L.L.P.

(57) ABSTRACT

A reception apparatus receiving a stream delivered by multicast through a network includes: a stream receiving a stream of a first channel as a viewing stream and one or more streams of second channels as viewing candidate streams; a buffer section storing the streams of the channels received by the stream reception section; a reproduction processing section performing processing for viewing the stream stored as the viewing stream in the buffer section; and a channel causing, when an instruction to switch over, as a viewing target, from the first channel to any one of the second channels of the streams being received as the viewing candidate streams is input, the reproduction processing section to process as the viewing stream the stream corresponding to the second channel and stored in the buffer section, and the stream to receive the stream as the viewing stream.

18 Claims, 11 Drawing Sheets

RECEPTION APPARATUS AND METHOD FOR REDUCING TIME DELAY IN CHANNEL SWITCHING

BACKGROUND OF THE INVENTION

1. Field of the Invention

The present invention relates to a reception apparatus, a reception method, and a computer program, and more specifically, to a reception apparatus that receives data by multicast delivery, a reception method, and a computer program.

2. Description of the Related Art

Along with recent advances in network technology, programs (contents) have been delivered through networks. Providers that deliver programs convert the programs into IP (Internet Protocol) packets, and then deliver the programs from servers by multicast delivery in which the same signal is delivered to a plurality of recipients. Protocols generally used to receive programs by the multicast delivery include IGMP (Internet Group Management Protocol) for IPv4 network environments and MLD (Multicast Listener Discovery) for IPv6 network environments.

When a program by the multicast delivery is received using IGMP (or MLD), a reception apparatus transmits a signal that is called Join message when receiving a stream of a content. By transmitting the Join message, the reception apparatus can participate in a multicast group and view a content corresponding to the multicast group. To stop viewing the content, a signal that is called Leave message is transmitted. By transmitting the Leave message, the reception apparatus can leave the multicast group and stop viewing the content.

In the multicast delivery of contents through networks, since the transmission processing of a Join message and a Leave message as described above becomes necessary for switching contents, that is, switching channels, viewed in the reception apparatus, there arises a problem that a waiting time required for the channel switching is longer than for delivery by airwaves. Therefore, it is necessary to realize high-speed channel switching in the multicast delivery of contents through network.

Japanese Patent Application Laid-open No. 2008-022393 (hereinafter, referred to as Patent Document 1) discloses a method in which a home gateway device receives a stream obtained by multiplexing data of a plurality of contents, and when receiving information of a channel corresponding to a desired content from a receiving terminal, separates data of a content corresponding to the appropriate channel from the multiplexed stream to supply it to the receiving terminal.

SUMMARY OF THE INVENTION

However, in the method of Patent Document 1, since a time lag occurs until content data of a channel after switching is made from the home gateway device to the receiving terminal is transmitted, there is a limit on a high-speed channel switching.

In this regard, there is proposed a method of controlling a transmission timing of each of a Leave message and a Join message so that participation in a multicast group corresponding to a channel as a switching destination is performed before separation from a multicast group corresponding to a channel being viewed is performed. However, in this method, in a case where there occurs a transmission delay or loss of the Leave message and the Join message due to a problem of a network etc., switching of viewing channels cannot be performed smoothly.

In view of the circumstances described above, there is a need for a reception apparatus capable of reducing a time necessary to switch channels for viewing multicast streams, a reception method, and a computer program.

According to an embodiment of the present invention, there is provided a reception apparatus receiving a stream delivered by multicast through a network, the reception apparatus including: a stream reception section to receive a stream of a first channel as a viewing stream and receive one or more streams of second channels as viewing candidate streams; a buffer section to store the streams of the first channel and the second channels, the streams being received by the stream reception section; a reproduction processing section to perform processing for viewing the stream stored as the viewing stream in the buffer section; and a channel processing section to cause, when an instruction to switch over, as a viewing target, from the first channel to any one of the second channels of the streams being received as the viewing candidate streams is input, the reproduction processing section to process as the viewing stream the stream corresponding to the second channel, the stream being stored in the buffer section, and cause the stream reception section to receive the stream corresponding to the second channel as the viewing stream.

In the reception apparatus according to the embodiment of the present invention, apart from the viewing stream of the first channel, one or more streams of the second channels as the viewing candidate streams are received by the stream reception section and buffered in the buffer section. The channel processing section causes, when an instruction to switch over, as a viewing target, from the first channel to any one of the second channels of the streams being received as the viewing candidate streams is input, the reproduction processing section to process as the viewing stream the stream corresponding to the second channel, the stream being stored in the buffer section, and cause the stream reception section to receive the stream corresponding to the second channel as the viewing stream. Accordingly, it is possible to reduce a time necessary to switch the viewing channels from the standpoint of the user.

In the reception apparatus according to the embodiment of the present invention, when the instruction is input, the channel processing section further causes the stream reception section to receive the stream of the first channel as the viewing candidate stream or stop receiving the stream of the first channel. Accordingly, the switching of viewing target channels is performed suitably.

In the reception apparatus according to the embodiment of the present invention, the channel processing section may set the number of the second channels to be maximum within a range of resources that the reception apparatus can use to receive and buffer the streams. Accordingly, it is possible to reduce a time necessary to switch viewing channels while achieving multichanneling of the multicast streams.

In the reception apparatus according to the embodiment of the present invention, the buffer section includes a capacity allocated for each channel that receives a stream, and the capacity allocated to each of the second channels is set to a value at which reproduction of a video and an audio obtained immediately after viewing channels are switched is ensured. Accordingly, by only waiting for a short period of time required for reproduction processing such as decoding after generating the instruction to switch viewing channels, it is possible to switch the viewing channels from the standpoint of the user and enhance use efficiency of the buffering capacity.

In the reception apparatus according to the embodiment of the present invention, the channel processing section may calculate an order of priority on all channels capable of receiving a stream with reference to preference of a user, and may select a channel as the second channel in a descending order of priority. Accordingly, when the user selects a desired channel that is switched to, a probability that the desired channel is selected from the second channels can be made larger.

In the reception apparatus according to the embodiment of the present invention, the channel processing section causes the stream reception section to receive a media stream and an error correction stream for the media stream as the viewing stream and receive only the media stream as the viewing candidate stream. As described above, only the media stream is received as the viewing candidate stream by the stream reception section, with the result that resources such as a network bandwidth and a buffering capacity available for the reception apparatus to receive and buffer a stream can be used efficiently.

In the reception apparatus according to the embodiment of the present invention, the channel processing section may acquire information for evaluating transmission characteristics of the network and based on the information, may dynamically change the maximum number of the second channels. Accordingly, following fluctuations of the network transmission characteristics, a maximum number of the second channels can be optimized, with the result that it is possible to prevent that the reception of the streams of the channels, the buffering operations, and the reproduction of media streams become unstable due to shortage of the network bandwidth and the buffering capacity.

Further, according to another embodiment of the present invention, there is provided a reception method for receiving a stream delivered by multicast through a network, the reception method including: receiving a stream of a first channel as a viewing stream and receiving one or more streams of second channels as viewing candidate streams; storing the received streams of the first channel and the second channels in a buffer section; and reproducing, when an instruction to switch over, as a viewing target, from the first channel to any one of the second channels of the streams being received as the viewing candidate streams is input, the stream corresponding to the second channel as the viewing stream, the stream being stored in the buffer section, and receiving the stream corresponding to the second channel as the viewing stream.

Further, according to still another embodiment of the present invention, there is provided a computer program causing a computer to operate as a reception apparatus receiving a stream delivered by multicast through a network, the computer program causing the computer to function as: a stream reception section to receive a stream of a first channel as a viewing stream and receive one or more streams of second channels as viewing candidate streams; a buffer section to store the streams of the first channel and the second channels, the streams being received by the stream reception section; a reproduction processing section to perform processing for viewing the stream stored as the viewing stream in the buffer section; and a channel processing section to cause, when an instruction to switch over, as a viewing target, from the first channel to any one of the second channels of the streams being received as the viewing candidate streams is input, the reproduction processing section to process as the viewing stream the stream corresponding to the second channel, the stream being stored in the buffer section, and cause the stream reception section to receive the stream corresponding to the second channel as the viewing stream.

As described above, according to the embodiments of the present invention, it is possible to reduce a time necessary to switch channels for viewing multicast streams.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

(First Embodiment)

(Configuration of Multicast Delivery System)

Figure 1:
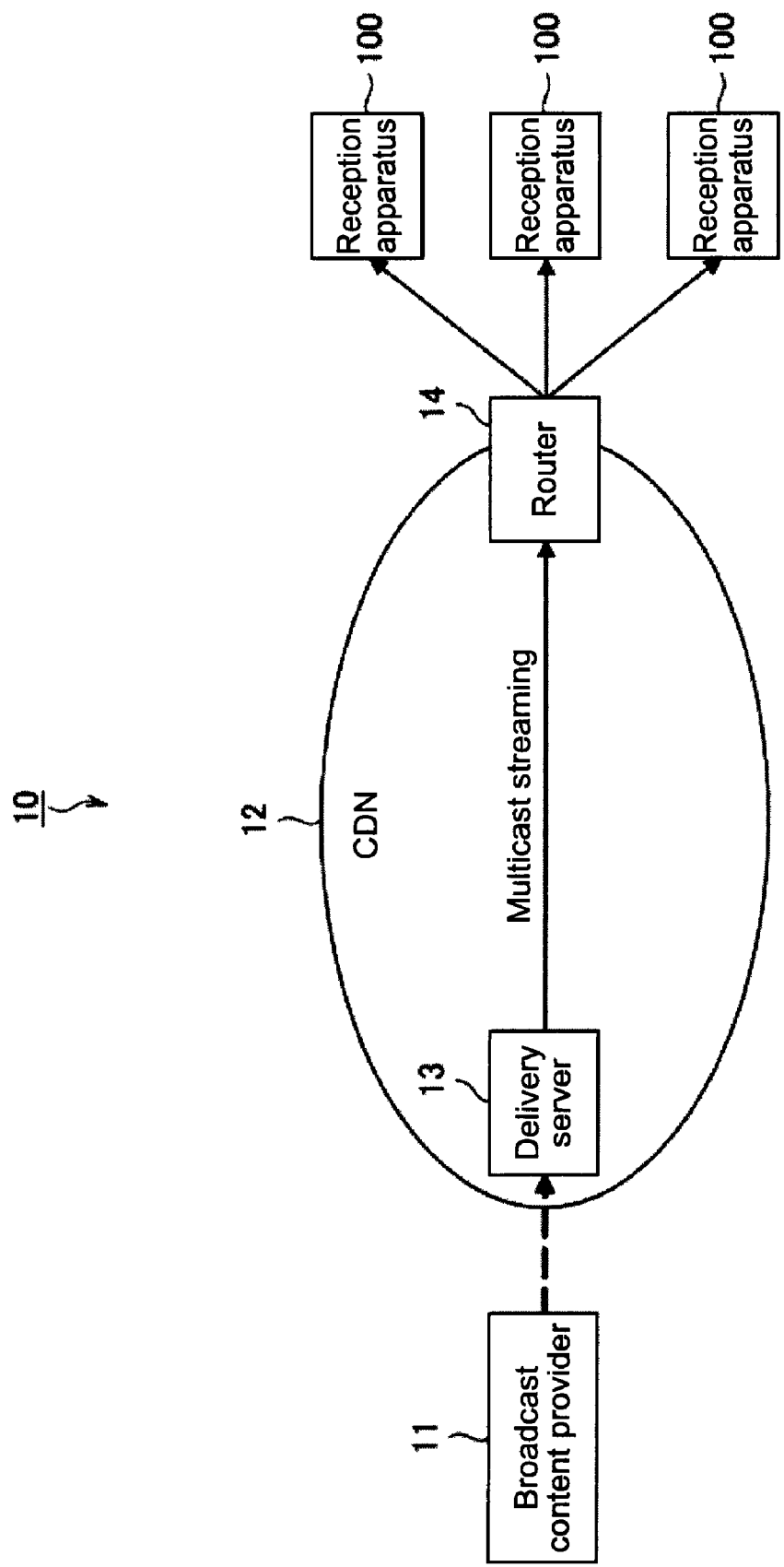
FIG. 1 is a block diagram showing a configuration of a multicast delivery system that uses a reception apparatus according to a first embodiment of the present invention.

FIG. 1 is a diagram showing a configuration of a multicast delivery system 10 that uses a reception apparatus 100 according to a first embodiment of the present invention.

As shown in FIG. 1, the multicast delivery system 10 includes a delivery server 13 and a router 14. The delivery server 13 is used by a broadcast content provider 11 to deliver a stream of a content by a multicast method. The router 14 delivers the stream of a content delivered by the delivery server 13 to the reception apparatus 100 as a destination. The delivery server 13 and the router 14 are connected to each other by a CDN (Contents Delivery Network) 12. The CDN 12 is a network optimized to deliver a digital content with a large file size via a network.

Here, the stream of a content delivered by the delivery server 13 is constituted of a media stream that contains data such as video/audio/subtitle of the content and an FEC (Forward Error Correction) stream for error correction of the media stream. These streams are separately transferred through different channels.

The router 14 groups one or more reception apparatuses 100 that receive a stream of a content in the same channel and assigns a multicast IP address to the group (multicast group). Accordingly, each of the reception apparatuses 100 can receive a packet addressed to the multicast IP address of the group to which the reception apparatus 100 belongs while regarding the packet as a packet addressed thereto. Upon receiving from a reception apparatus 100 a Join message that contains information for identifying a group that the reception apparatus 100 is intended to join, the router 14 performs processing of causing the reception apparatus 100 to join the group. Upon receiving a Leave message that indicates separation from the group, the router 14 performs processing of causing the reception apparatus 100 to leave the group.

The router 14 can be connected with one or more reception apparatuses 100 through a local network.

Though FIG. 1 shows one delivery server 13 and one router 14 for convenience, a plurality of delivery servers and routers can be connected on the CDN 12 in the multicast delivery system 10.

The reception apparatus 100 only needs to be equipment capable of receiving a stream of a content and reproducing it. Specifically, examples of the equipment include computer equipment such as a Personal Computer (PC), a television receiver, a cellular phone, a PDA (Personal Digital Assistant), and recording equipment.

(Configuration of Reception Apparatus 100)

Next, a configuration of the reception apparatus 100 will be described.

Figure 2:
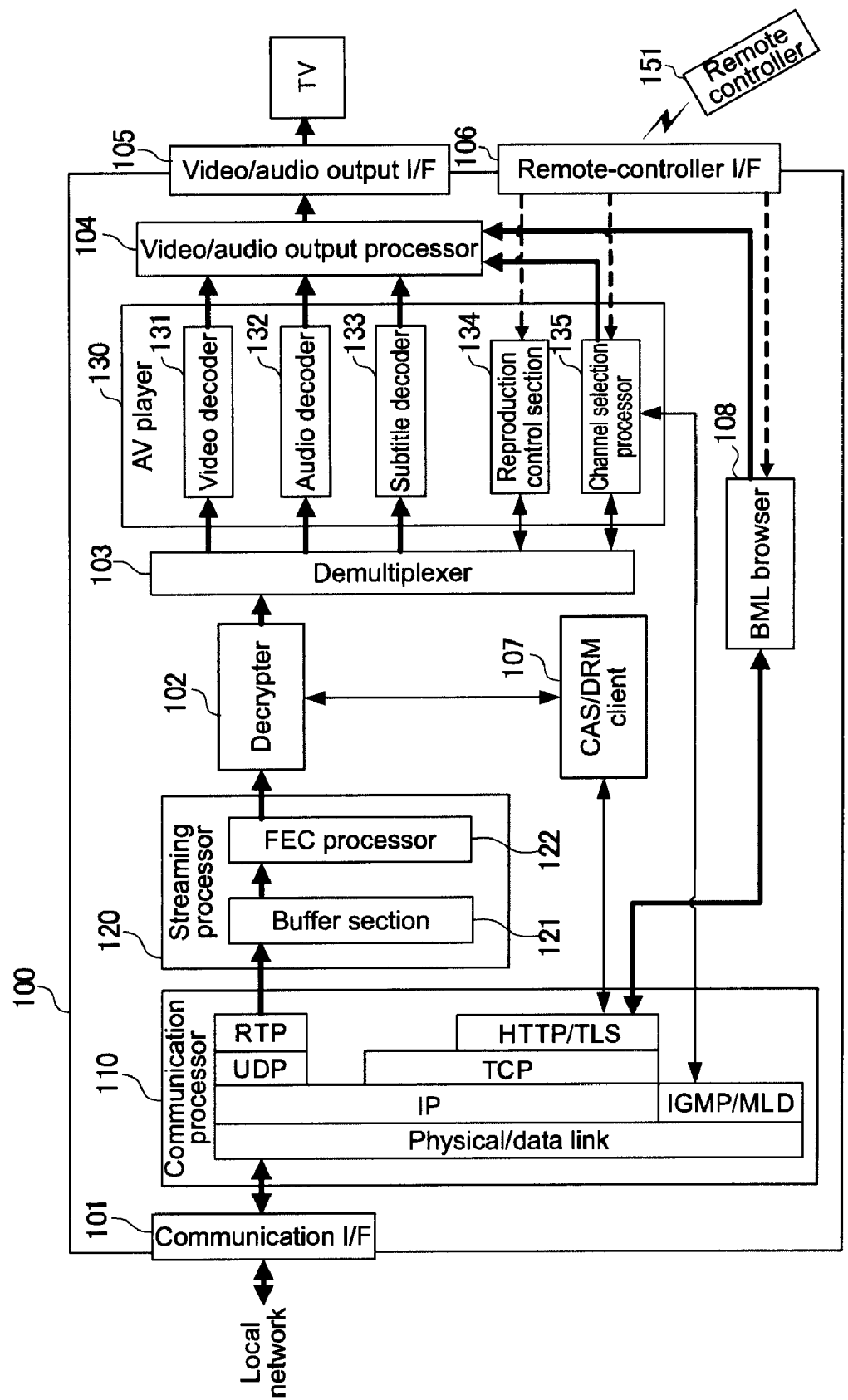
FIG. 2 is a block diagram showing a configuration of the reception apparatus according to the first embodiment of the present invention.

FIG. 2 is a block diagram showing a configuration of the reception apparatus 100.

As shown in FIG. 2, the reception apparatus 100 includes a communication interface 101, a communication processor 110, a streaming processor 120, a decrypter 102, a demultiplexer 103, an AV player 130, a video/audio output processor 104, a video/audio output interface 105, a remote-controller interface 106, a CAS (Conditional Access System)/DRM (Digital Rights Management) client 107, and a BML (Broadcast Markup Language) browser 108.

The communication interface 101 is an interface that connects the reception apparatus 100 to the network. In this embodiment, the reception apparatus 100 is connected to a local network through the communication interface 101.

The communication processor 110 (stream reception section) performs communication in a physical/data link layer, an IP (Internet Protocol) layer, an IGMP (Internet Group Management Protocol)/MLD (Multicast Listener Discover) layer, a UDP (User Datagram Protocol) layer, a TCP (Transmission Control Protocol) layer, an RTP (Real-time Transport Protocol) layer, and HTTP (Hypertext Transfer Protocol)/TLS (Transport Layer Security) layer. The communication processor 110 performs, for example, processing of receiving a stream of a content delivered from the delivery server 13 to the CDN 12 via the router 14 and transmitting various messages from the reception apparatus 100 to the router 14.

The streaming processor 120 includes a buffer section 121 and an FEC processor 122. The buffer section 121 stores a media stream of a received content and an FEC stream thereof for buffering. The FEC processor 122 performs error correction processing on the media stream stored in the buffer section 121 using the FEC stream. Output from the streaming processor 120 is the media stream that has been subjected to the error correction.

The decrypter 102 decrypts the media stream obtained after the error correction, which is output from the streaming processor 120. The decrypter 102 acquires from the CAS/DRM client 107, before decrypting the media stream of the content, information for judging whether the media stream of the content can be decrypted. The decrypter 102 decrypts the media stream if judging that the decryption can be made.

The demultiplexer 103 demultiplexes the media stream decrypted by the decrypter 102 into various pieces of data such as video data, audio data, and subtitle data. Since the media stream is delivered after data such as video data, audio data, and subtitle data has been multiplexed by a multiplexer in the delivery server 13, the reception apparatus 100 needs the demultiplexer 103 for demultiplexing the multiplexed data.

The AV player 130 includes a video decoder 131, an audio decoder 132, a subtitle decoder 133, a reproduction control section 134, a channel selection processor 135, and the like. The video decoder 131 decodes the video data demultiplexed by the demultiplexer 103. The audio decoder 132 decodes the audio data demultiplexed by the demultiplexer 103. The subtitle decoder 133 decodes the subtitle data demultiplexed by the demultiplexer 103. The reproduction control section 134 executes processing for various operations such as reproduction/stop/pause that are input by a user with a remote controller 151 and the like. The channel selection processor 135 (channel processing section) performs processing of selecting a channel to be viewed that is input by the user with the remote controller 151 and the like (hereinafter, referred to as viewing channel) and switching viewing channels. Further, the channel selection processor 135 automatically selects a channel that is delivering a content suiting a preference of the user and performs processing of receiving a media stream of the channel as a viewing candidate stream.

The video/audio output processor 104 combines an output of the video decoder 131, an output of the subtitle decoder 133, and an image generated by the BML browser 108 and outputs the resultant to video/audio output equipment such as an externally-connected television through the video/audio output interface 105. Further, the video/audio output processor 104 outputs an output of the audio decoder 132 to video/audio output equipment such as an externally-connected television through the video/audio output interface 105.

It should be noted that the reception apparatus 100 may be provided with a video display section and an audio output section and video data and audio data may be output to those sections.

The remote-controller interface 106 is an interface for transmitting and receiving a radio signal such as an infrared signal with respect to the remote controller 151. The remote-controller interface 106 notifies various instructions input by the user through the remote controller 151 to the reproduction control section 134 and the channel selection processor 135 in the AV player 130, the BML browser 108, and other blocks.

The BML browser 108 performs processing for viewing data described in BML. BML is a page-description language for XML (Extensible Markup Language)-based data broadcast. The BML browser 108 generates display information by interpreting data described in BML and then outputs the display information to the video/audio output processor 104.

The CAS/DRM client 107 manages CAS and DRM.

Hereinabove, the configuration of the reception apparatus 100 according to the first embodiment of the present invention has been described.

(Selection and Reception of Viewing Channel)

Next, operations from selection to reception of a viewing channel in the reception apparatus 100 will be described.

The reception apparatus 100 acquires an IP address assigned thereto in the communication processor 110 and establishes an IP connection with the CDN 12. Then, the reception apparatus 100 acquires configuration information necessary to access various delivery servers in accordance with a URI (Uniform Resource Identifier) uniquely specified. Based on the configuration information, the reception apparatus 100 judges whether a multicast broadcast can be received through the CDN 12. When judging that a multicast broadcast can be received, the reception apparatus 100 extracts a multicast address for acquiring SI (Service Information) from the configuration information. The SI contains content management information such as a channel name, a broadcast time, a title, and a performer of a content to be broadcast by multicast, and NIT (Network Information Table) as information associating a channel and a multicast address with each other. A content of one channel are constituted of a media stream containing data such as video data, audio data, and subtitle data and an FEC stream serving as data for error correction. The media stream and the FEC stream are separately delivered using different multicast groups.

Next, in order to acquire the SI, the reception apparatus 100 transmits to the router 14 a Join message for requesting participation in a multicast group corresponding to a channel that delivers the SI by multicast. The Join message contains a multicast address corresponding to the channel that delivers the SI by multicast, as an address specifying the multicast group. When receiving the Join message transmitted from the reception apparatus 100, the router 14 registers in an IGMP table an IP address of the reception apparatus 100 in association with an IP address of a delivery sever (not shown) that is a transmission source of the SI. Accordingly, from here on, in accordance with the information registered in the IGMP table, the router 14 performs routing, to the reception apparatus 100, of a stream of the SI with a predetermined platform, the stream being delivered from the delivery server as the transmission source of the SI.

The reception apparatus 100 receives the stream of the SI delivered from the delivery server and stores it. In a case where the user of the reception apparatus 100 wishes to select a viewing channel, the user inputs an instruction into the reception apparatus 100 so that the reception apparatus 100 is caused to display a channel selection list on a screen of the video/audio output equipment connected to the reception apparatus 100. In response to this instruction, the reception apparatus 100 creates a channel selection list based on the stored SI and causes the video/audio output equipment to display the channel selection list. The user selects a desired channel on the displayed channel selection list and inputs a viewing request.

Upon receiving the viewing request of a channel from the user, the reception apparatus 100 extracts, from the SI, a multicast address of a media stream and a multicast address of an FEC stream, the media stream and the FEC stream being delivered using the selected channel. The reception apparatus 100 transmits to the router 14 a Join message for requesting participation in a corresponding multicast group for each channel. When receiving the Join message transmitted from the reception apparatus 100, the router 14 registers an IP address of the reception apparatus 100 in association with an address of the multicast group in the IGMP table. From here on, in accordance with the information registered in the IGMP table, the router 14 performs routing of each of the media stream and the FEC stream delivered from the delivery server 13 to the reception apparatus 100. The reception apparatus 100 receives the media stream and the FEC stream delivered from the delivery server 13.

(Typical Switching Operation of Viewing Channels)

Figure 3:
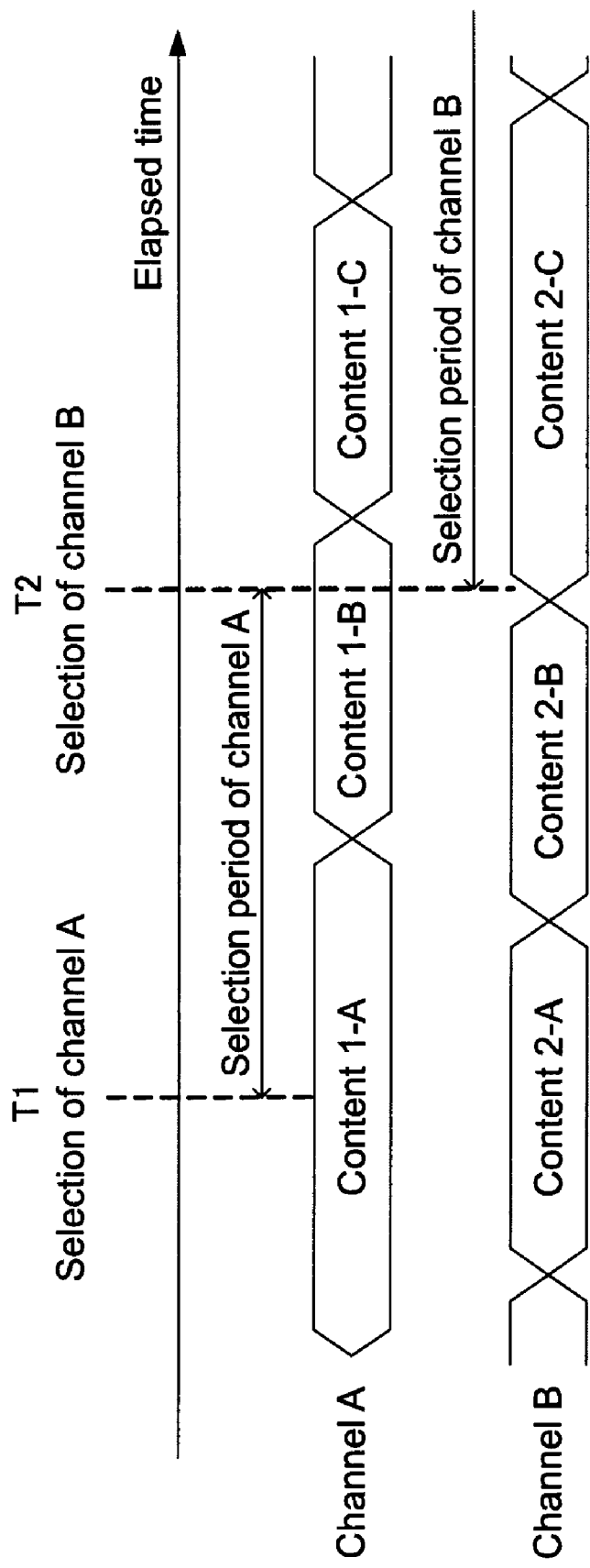
FIG. 3 is a diagram for describing an example of switching viewing channels in a typical reception apparatus.

FIG. 3 is a diagram showing an example of switching viewing channels in a typical reception apparatus. FIG. 3 shows a switching example between two channels A and B. In the example, the user selects viewing of the channel A at a time point T1 and after a period of time, makes a switch to viewing of the channel B at a time point T2.

Figure 4:
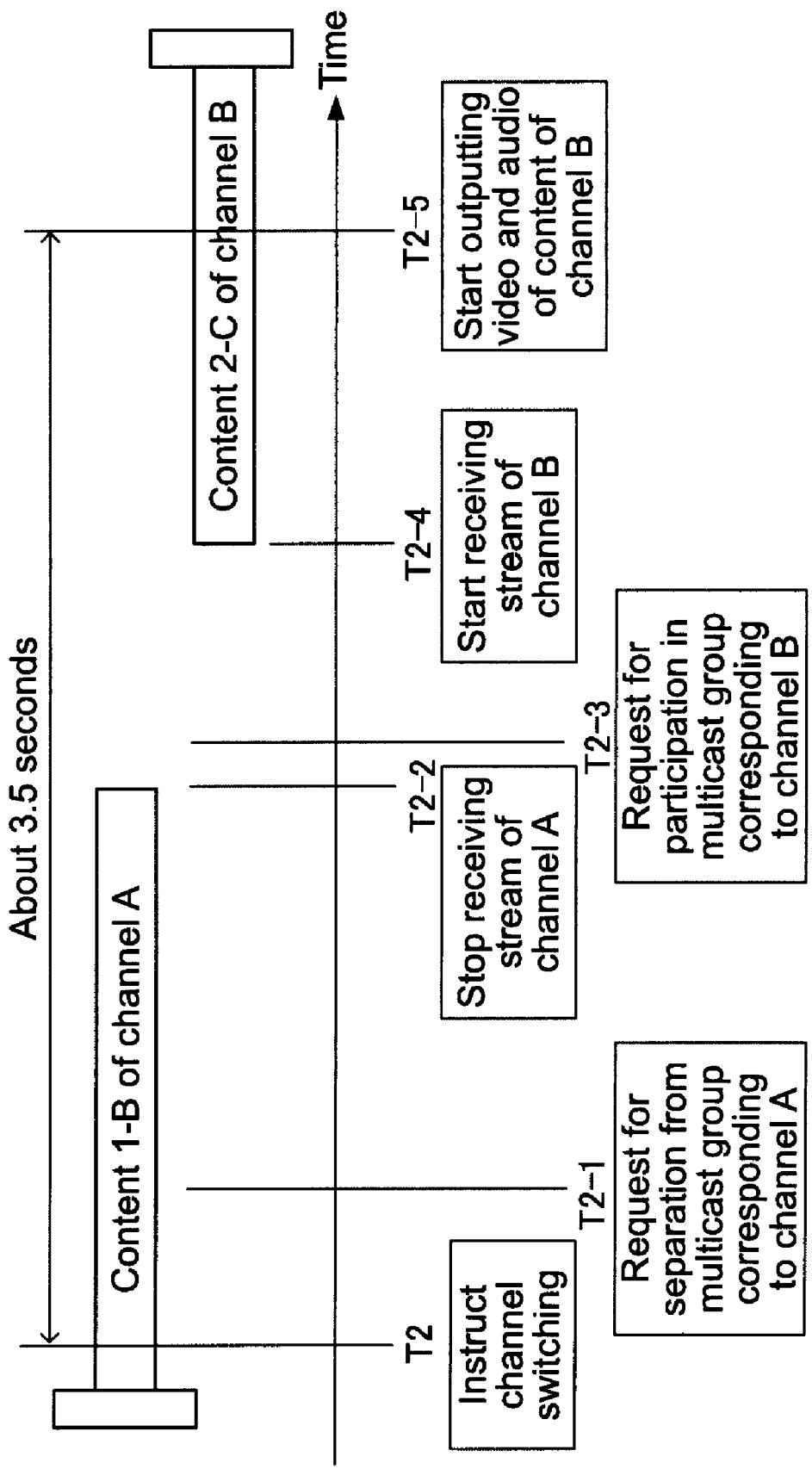
FIG. 4 is a diagram showing a time axis enlarged at a time point T2 at which the switching of viewing channels of FIG. 3 occurs.

FIG. 4 is a diagram showing a time axis enlarged at the time point T2 at which the switching of viewing channels of FIG. 3 occurs. First, at the time point T2, the user gives an instruction to switch the viewing channels from the channel A to the channel B. The typical reception apparatus that has received the instruction to switch the viewing channels transmits, to a router, a Leave message that is a multicast report requesting separation from a multicast group corresponding to the channel A at a time point T2-1.

Upon receiving, from the reception apparatus, the Leave message that requests separation from the multicast group corresponding to the channel A, the router deletes the IP address of the reception apparatus registered in the IGMP table in association with an address of the multicast group corresponding to the channel A. Accordingly, the routing of the stream of the channel A to the reception apparatus by the router is stopped after a time point T2-2.

Next, the reception apparatus transmits, to a router, a Join message that is a multicast report requesting participation in a multicast group corresponding to the channel B at a time point T2-3. Upon receiving the Join message, the router registers the IP address of the reception apparatus in the IGMP table in association with an address of the multicast group. From here on, in accordance with the information registered in the IGMP table, the router operates so as to perform routing of a multicast stream of the channel B to the reception apparatus. Accordingly, the reception apparatus starts receiving the stream of the channel B from a time point T2-4, and through processing such as buffering, error correction, and decryption, a video and an audio of the content of the channel B is started to be output from a time point T2-5.

As described above, the typical reception apparatus needs such a procedure that, in order to switch the viewing channels, transmits the Leave message, transmits the Join message after separation from a multicast group of a channel being selected before the switching, and joins a multicast group of a channel that is newly selected. As a result, it takes a long time (about 3.5 seconds) to switch the viewing channels, that is, a period of time from a time when the user inputs the viewing channel switching instruction to a time when a switch to a viewing channel to be actually output is made.

The reception apparatus 100 according to the first embodiment of the present invention performs the following operation in order to reduce a time necessary to switch viewing channels.

(Concept of Viewing Channel Switching Operation According to the Present Invention)

Figure 5:
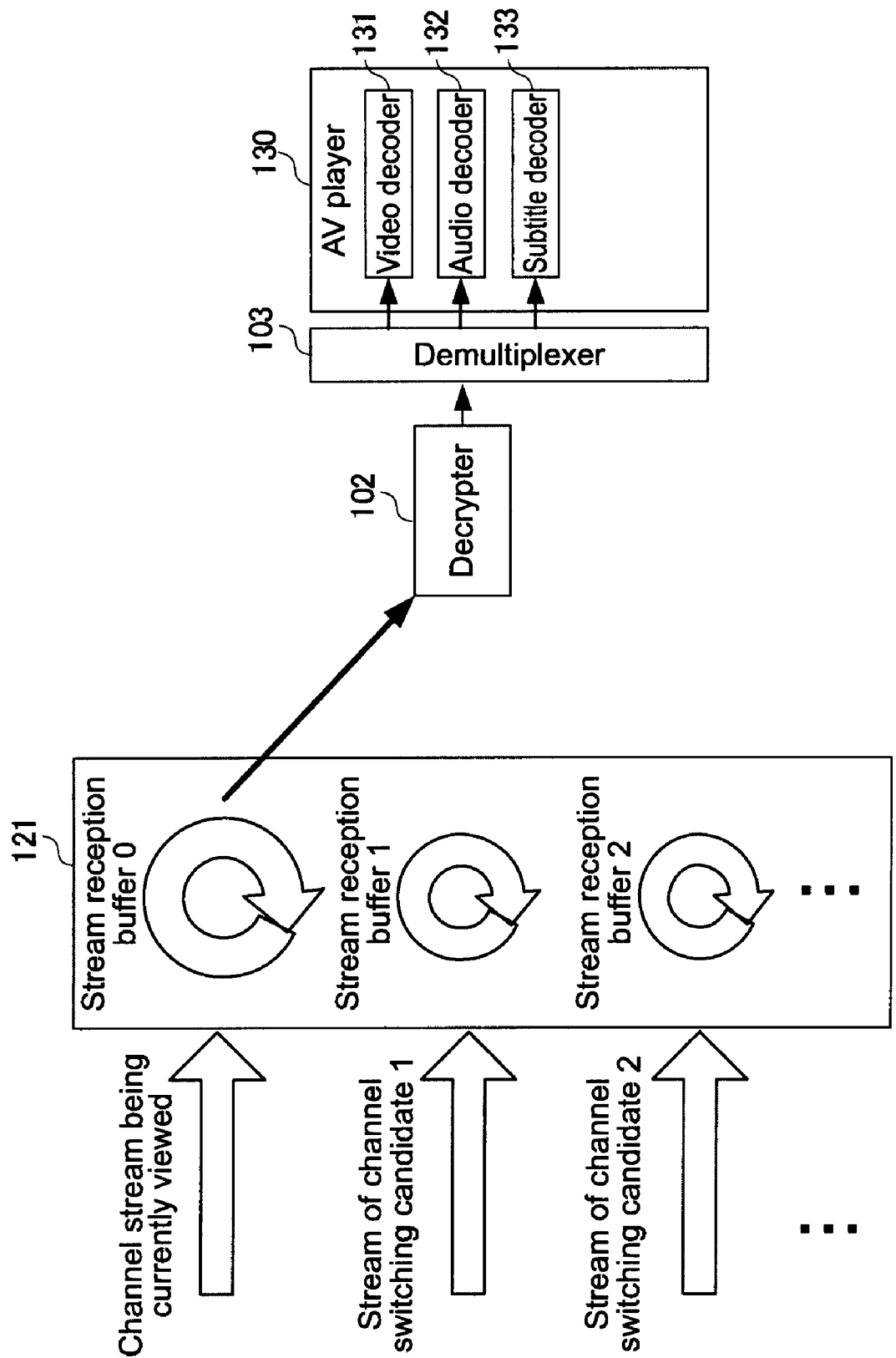
FIG. 5 is diagram for describing a viewing channel switching operation in the reception apparatus according to the first embodiment of the present invention.

FIG. 5 is a diagram for describing a concept of a viewing channel switching operation in the reception apparatus 100 according to the first embodiment of the present invention.

The reception apparatus 100 receives a media stream and an FEC stream of a content of a viewing channel selected by the user and buffers them in the buffer section 121 of the streaming processor 120. The buffered media stream and FEC stream are processed in the FEC processor 122 (see FIG. 2) and become a media stream that has been subjected to error correction. Then, the media stream obtained after the error correction is decrypted in the decrypter 102 and demultiplexed by the demultiplexer 103 into various kinds of data such as video data, audio data, and subtitle data. The pieces of data demultiplexed are each decoded by the video decoder 131, the audio decoder 132, and the subtitle decoder 133 in the AV player 130. The outputs of the video decoder 131, the audio decoder 132, and the subtitle decoder 133 are output by the video/audio output processor 104 (see FIG. 2) to video/audio output equipment such as an externally-connected television through the video/audio output interface 105. Accordingly, the content of the channel selected by the user can be viewed.

On the other hand, the reception apparatus 100 receives and buffers a media stream of another channel automatically selected, as a viewing candidate stream. In this case, the FEC stream is not received. In other words, the reception apparatus 100 joins a multicast group corresponding to the viewing channel and one or more other multicast groups at the same time, and then receives and buffers streams of channels corresponding to the respective multicast groups as viewing candidate streams. Each of the buffered viewing candidate streams is discarded from an older packet along with an elapse of the time so that a size of the buffered viewing candidate stream does not exceed a buffering capacity set for each channel. When the user inputs an instruction to switch over to any one of the channels being received as the viewing candidate streams, as a viewing target channel, the reception apparatus 100 decodes the buffered stream of the relevant channel and starts reproduction. At the same time, the reception apparatus 100 starts receiving the stream of the relevant channel as a viewing target stream. Accordingly, the time necessary to switch the viewing channels is largely reduced from the standpoint of the user.

Here, a method of selecting a channel that receives a stream as a viewing candidate stream will be described. Selection of a channel that receives a stream as a viewing candidate stream is automatically performed by the channel selection processor 135.

Figure 6:
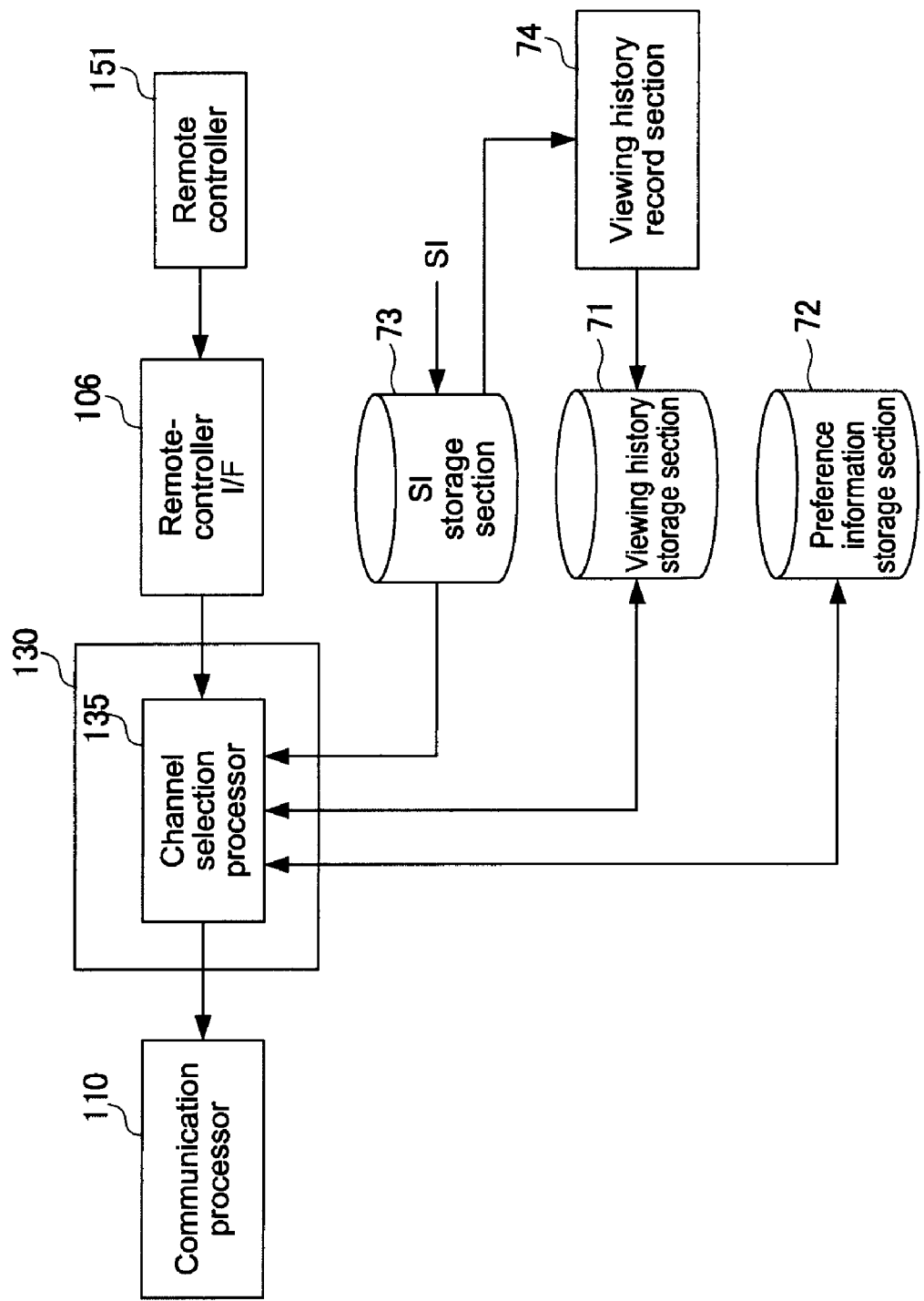
FIG. 6 is a block diagram relating to channel selection of a viewing candidate stream by a channel selection processor.

FIG. 6 is a block diagram relating to channel selection of a viewing candidate stream by the channel selection processor 135. An SI storage section 73 stores SI acquired through the CDN 12.

Each time a content is viewed, a viewing history record section 74 extracts information on the content, such as a channel, a title, a genre, a performer, and a broadcast time, from the SI stored in the SI storage section 73 and accumulates the extracted information as a viewing history in a viewing history storage section 71.

Based on the user's viewing history stored in the viewing history storage section 71, the channel selection processor 135 judges information on a channel, a title, a genre, a performer, and the like suiting a preference of the user by a statistical technique, generates preference information of the user based on the judgment result, and stores it in a preference information storage section 72. The generation of the user's preference information is performed each time the viewing history stored in the viewing history storage section 71 is updated, for example, and accordingly the contents of the preference information storage section 72 are also updated in each case. The channel selection processor 135 determines an order of priority with respect to all channels that are delivering contents based on the user's preference information stored in the preference information storage section 72.

Further, the channel selection processor 135 judges whether there exist an unused portion of a network bandwidth and a free space of a buffering capacity that are necessary to receive a stream of a new channel. When there exist both the unused portion and the free space, the channel selection processor 135 gives an instruction to the communication processor 110 to issue to the router 14 a Join message for requesting participation in a multicast group corresponding to a channel selected in a descending order of priority.

Hereinabove, the configuration relating to the channel selection of the viewing candidate stream by the channel selection processor 135 has been described.

(Details of Viewing Channel Switching Operation According to the Present Invention)

Next, a viewing channel switching operation in the reception apparatus 100 according to the first embodiment of the present invention will be described in detail.

First, with reference to FIG. 7, preprocessing for viewing channel switching processing will be described. The user operates the remote controller 151 to instruct a display of the channel selection list. The instruction from the remote controller 151 is received by the remote-controller interface 106 and notified to the channel selection processor 135 in the AV player 130. When receiving the instruction to display the channel selection list, the channel selection processor 135 generates a channel selection list based on the SI stored in the SI storage section 73 and output it to the video/audio output processor 104. The video/audio output processor 104 generates display information of the channel selection list and outputs it to video/audio output equipment such as an externally-connected television through the video/audio output interface 105. Accordingly, the channel selection list is presented to the user.

The user operates the remote controller 151 to select a channel that the user wishes to view from the channel selection list and input a viewing request. Accordingly, the viewing request containing information of the selected channel is given to the channel selection processor 135 of the AV player 130. Upon receiving the viewing request, based on the information of the channel contained in the viewing request, the channel selection processor 135 extracts a multicast address of a media stream and a multicast address of an FEC stream that correspond to a content delivered by the relevant channel from the SI stored in the SI storage section 73.

Next, the channel selection processor 135 requests the communication processor 110 to transmit a Join message that requests participation in a multicast group corresponding to the extracted multicast address of the media stream and a Join message that requests participation in a multicast group corresponding to the extracted multicast address of the FEC stream. In response to the request of those messages, the communication processor 110 transmits the Join messages to the router 14 (Step S201). When receiving the Join messages transmitted from the reception apparatus 100, the router 14 registers the IP address of the reception apparatus 100 in the IGMP table in association with the addresses of those multicast groups. From here on, the router 14 operates so as to perform routing of the media stream and the FEC stream delivered from the delivery server to the reception apparatus 100 in accordance with the information registered in the IGMP table. The reception apparatus 100 receives the media stream and the FEC stream delivered from the delivery server, and reproduces the content through processing such as buffering, error correction, and decryption.

Then, the channel selection processor 135 determines an order of priority with respect to all channels that are delivering contents based on the user's preference information stored in the preference information storage section 72 (Step S202). A method of determining an order of priority will be described later.

Next, the channel selection processor 135 selects a highest priority channel out of channels other than the channel being viewed, as a target channel to be judged as to whether a media stream of the channel should be received as a viewing candidate stream (hereinafter, referred to as "judgment target channel" (Step S203).

Next, the channel selection processor 135 calculates a network bandwidth and a buffering capacity that are currently available in the reception apparatus 100 (Step S205). In this case, "network bandwidth currently available" is obtained by subtracting a bandwidth currently consumed from the entire bandwidth that is allocated to the reception apparatus 100. "Buffering capacity currently available" is obtained by subtracting a buffering capacity currently consumed from the entire buffering capacity that is prepared for the reception apparatus 100 to receive a stream.

Next, the channel selection processor 135 calculates a network bandwidth to be consumed and a buffering capacity to be consumed due to reception of a media stream of a judgment target channel (Step S206). Here, the buffering capacity to be consumed due to the reception of a media stream of a judgment target channel is calculated as, for example, a×t [Mbit] when a transmission rate of the media stream of the judgment target channel is assumed as a [Mbps]. In this case, t represents a buffering time and a unit is second [sec]. The value of t may be a fixed value or may be a value set by the user. Alternatively, the value may be a value that is dynamically changed in accordance with network transmission characteristics or a buffer free space.

Then, the channel selection processor 135 judges whether a network bandwidth and a buffering capacity necessary to receive the media stream of the judgment target channel remain (Step S207). The judgment is performed by comparing the network bandwidth and buffering capacity currently available, which are calculated in Step S205, with the network bandwidth and buffering capacity to be consumed, which are calculated in Step S206. Specifically, in a case where the network bandwidth currently available is smaller than the network bandwidth to be consumed, or the buffering capacity currently available is smaller than the buffering capacity to be consumed, it is judged that necessary network bandwidth and buffering capacity does not remain. Conversely, in a case where the network bandwidth currently available is larger than the network bandwidth to be consumed and the buffering capacity currently available is larger than the buffering capacity to be consumed, it is judged that necessary network bandwidth and buffering capacity remain.

In the case where the channel selection processor 135 judges that necessary network bandwidth and buffering capacity remain, the channel selection processor 135 judges whether the media stream of the judgment target channel is flowing to a local network to which its own reception apparatus 100 is connected (Step S208). The judgment is performed, for example, in the communication processor 110 by checking a multicast address contained in a multicast packet of the media stream. Specifically, the communication processor 110 compares a multicast address of a multicast packet that has arrived, with a multicast address of the media stream of the judgment target channel. When both the multicast addresses coincide with each other, the communication processor 110 determines that the media stream of the judgment target channel is flowing to the local network to which the reception apparatus 100 is connected. Here, in a case where another reception apparatus connected to the local network views the content of the judgment target channel or is receiving the content as a viewing candidate stream, this means that the media stream of the judgment target channel is flowing to the local network.

In a case where the multicast packet of the media stream of the judgment target channel is flowing to the local network, the channel selection processor 135 issues an instruction to the communication processor 110 and the streaming processor 120 to receive and buffer the media stream as a viewing candidate stream. Accordingly, the reception and buffering of the viewing candidate stream is started in the reception apparatus 100 (Step S209).

In a case where it is judged in Step S208 that the multicast packet of the media stream of the judgment target channel is not flowing to the local network, the following operation is performed. The channel selection processor 135 extracts a multicast address of a media stream corresponding to the judgment target channel from the SI stored in the SI storage section 73. Then, the channel selection processor 135 requests the communication processor 110 to transmit a Join message for requesting participation in a multicast group corresponding to the extracted multicast address of the media stream.

In response to the request, the communication processor 110 transmits the Join message to the router 14 (Step S210). Upon receiving the Join message transmitted from the reception apparatus 100, the router 14 registers the IP address of the reception apparatus 100 in the IGMP table in association with an address of the multicast group. From here on, in accordance with the information registered in the IGMP table, the router 14 performs routing, to the reception apparatus 100, of the media stream of the relevant channel, the media stream being delivered from the delivery server. Accordingly, the reception and buffering of the stream of the relevant channel as a viewing candidate stream is started in the reception apparatus 100 (Step S209).

Subsequently, the channel selection processor 135 updates the judgment target channel to a next highest priority channel (Step S211). After that, the channel selection processor 135 returns to Step S205 and repeats the judgment processing for the judgment target channel of the next highest priority in the same manner. It should be noted that the reason the processing returns to Step S205 and the network bandwidth and buffering capacity currently available in the reception apparatus 100 are recalculated is that the network bandwidth and buffering capacity to be consumed are changed due to an increase of one reception channel at that moment.

While the above-described processing is repeated, there will occur a case where at least any one of the network bandwidth and the buffering capacity that are necessary to receive the stream of the judgment target channel does not remain in the judgment of Step S206. In this case, the channel selection processor 135 proceeds to Step S211 without starting reception and buffering of stream of the judgment target channel of this time and updates the judgment target channel to a next highest priority channel (Step S211). After that, the judgment processing for the updated judgment target channel is repeated in the same manner.

In a case where the judgment is performed on a channel having relatively-small network bandwidth and buffering capacity to be consumed, it may be judged in some cases that a network bandwidth and a buffering capacity necessary to receive a stream of the judgment target channel remain. In this case, the channel selection processor 135 requests the communication processor 110 to transmit to the router 14 a Join message for requesting participation in a multicast group corresponding to the judgment target channel. In accordance with the request, the communication processor 110 transmits the Join message to the router 14 (Step S210). Accordingly, the reception and buffering of the media stream of the judgment target channel as a viewing candidate stream is started in the reception apparatus 100.

When the judgment processing is finished on all channels and channels to be a judgment target does not exist in Step S204, (NO in Step S204), the preprocessing for viewing channel switching processing is ended.

As described above, in the reception apparatus 100, viewing candidate streams of as many channels as possible are received and buffered within a range of the network bandwidth and buffering capacity available in the reception apparatus 100.

Hereinabove, the preparation for viewing channel switching processing has been described.

Figure 8:
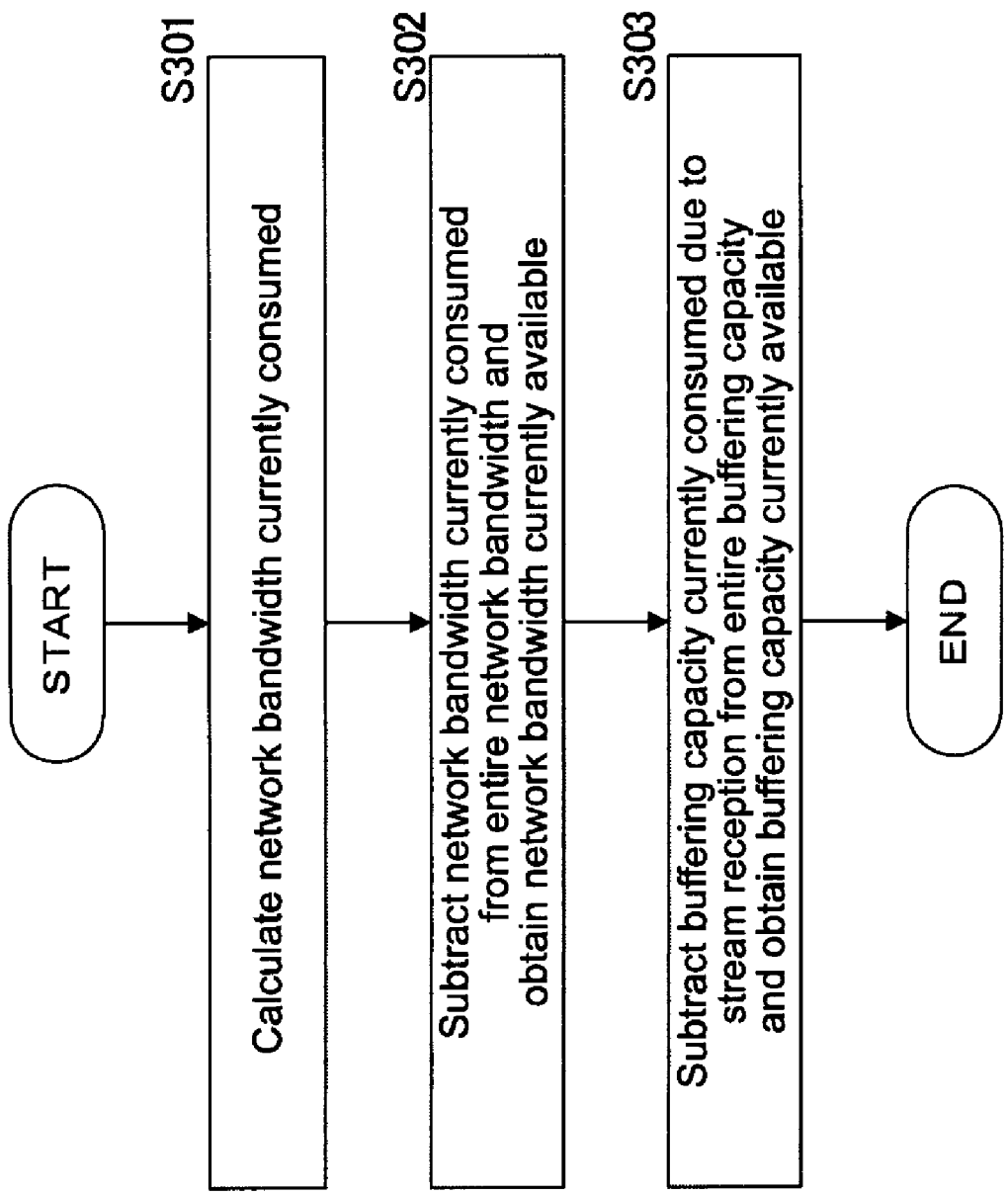
FIG. 8 is a flowchart of processing of calculating a network bandwidth and a buffering capacity available in the reception apparatus.

Next, the method of calculating the network bandwidth and buffering capacity available in the reception apparatus 100 in Step S205 will be described. FIG. 8 is a flowchart of processing of calculating the network bandwidth and buffering capacity available in the reception apparatus 100.

The channel selection processor 135 first calculates a network bandwidth that has currently been consumed (Step S301). This processing can be made based on a mean value of the number of transmission/reception packets per unit time, for example. Next, the channel selection processor 135 subtracts the network bandwidth that has currently been consumed from the entire network bandwidth allocated to the reception apparatus 100, and obtains the resultant as "network bandwidth currently available" mentioned in Step S205 (Step S302). Subsequently, the channel selection processor 135 subtracts a buffering capacity that has currently been consumed from the entire buffering capacity and obtains "buffering capacity currently available" (Step S303).

Next, the method of obtaining the network bandwidth and buffering capacity to be consumed due to the reception of a media stream of a judgment target channel will be described, the method being used for the channel selection processor 135 to judge whether a network bandwidth and buffering capacity that can receive the stream of the judgment target channel remain in Step S206.

Figure 9:
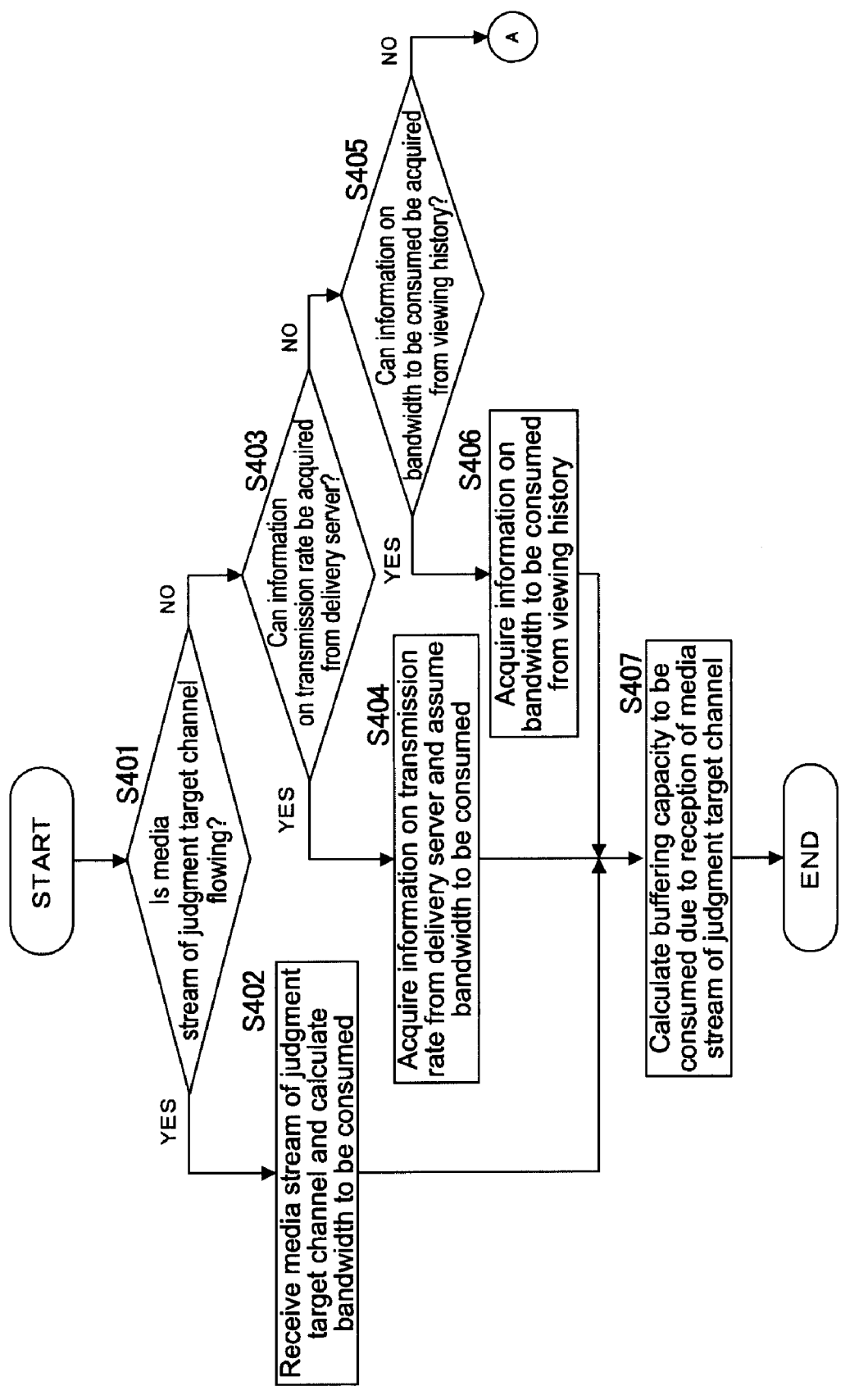
FIG. 9 is a flowchart of procedure for obtaining a network bandwidth and a buffering capacity to be consumed due to reception of a media stream of a judgment target channel.

FIG. 9 is a flowchart of procedure for obtaining the network bandwidth and buffering capacity to be consumed due to the reception of the media stream of the judgment target channel.

First, the channel selection processor 135 judges whether the media stream of the judgment target channel is flowing to the local network to which its own reception apparatus 100 is connected (Step S401). The situation where the media stream of the judgment target channel is flowing to the local network occurs, for example, in a case where another reception apparatus connected to the local network together with the its own reception apparatus 100 is viewing the media stream or receiving the media stream as a viewing candidate stream. In a case of judging that the media stream of the judgment target channel is flowing to the local network, the channel selection processor 135 receives the media stream and calculates a network bandwidth to be consumed from the number of transmission/reception packets etc. at that time (Step S402). After that, the channel selection processor 135 calculates a buffering capacity to be consumed due to the reception of the media stream of the judgment target channel (Step S407).

Here, the buffering capacity to be consumed due to the reception of the media stream of the judgment target channel is set to a value at which a moving image and an audio can be output only by the buffered stream immediately after viewing channel switching. More specifically, the buffering capacity to be consumed can be set by the channel selection processor 135 based on attribute information of the stream, such as an encoding method of determining an image quality of moving image data and a sound quality of audio data, and a bit rate of encoding. Accordingly, the buffering capacity to be consumed due to the reception of the media stream of the judgment target channel may be set to a value sufficiently small with respect to a buffering capacity for receiving a media stream of a viewing channel.

Further, in a case of judging that the media stream of the judgment target channel is not flowing to the local network, the channel selection processor 135 judges whether information on a transmission rate of the media stream can be acquired from the delivery server 13 (Step S403). When the information on a transmission rate of the media stream can be acquired from the delivery server 13, the channel selection processor 135 acquires the information on a transmission rate of the media stream from the delivery server 13 and assumes a network bandwidth to be consumed, based on the information of a transmission rate (Step S404). After that, the channel selection processor 135 calculates a buffering capacity to be consumed due to the reception of the media stream of the judgment target channel (Step S407).

Further, in a case where the information on a transmission rate of the media stream cannot be acquired from the delivery server 13, the channel selection processor 135 tries to acquire information on the network bandwidth to be consumed of the media stream based on the viewing history stored in the viewing history storage section 71 (Step S405). For example, the channel selection processor 135 judges from the viewing history whether a content whose channel, time zone, and title are the same as those of the content of the judgment target channel has been viewed in the past. In a case where the content has been viewed, the channel selection processor 135 extracts information on a network bandwidth to be consumed of the already-viewed content from the viewing history, and adopts it as information of a network bandwidth to be consumed of the media stream (Step S406). In order to prepare this processing, the viewing history record section 74 calculates a network bandwidth to be consumed of a media stream of a content at a time of receiving the content while viewing the content, and records the network bandwidth in association with the viewing history of the content stored in the viewing history storage section 71.

It should be noted that in a case where a content whose channel, time zone, and title are the same as those of the content of the judgment target channel has not been viewed, the following processing may be performed. The channel selection processor 135 searches the viewing history for a content whose channel and time zone are the same as those of the content of the judgment target channel. In other words, if the channels and the time zones are the same, it is judged that the content is related to the content of the judgment target channel even when their titles are different. The channel selection processor 135 extracts information on a network bandwidth to be consumed from the viewing history of the relevant content, the viewing history being stored in the viewing history storage section 71, and adopts the information as a network bandwidth to be consumed of the media stream of the judgment target channel. In a case where a plurality of contents are retrieved, a mean value of network bandwidths to be consumed of those contents is adopted as information as a network bandwidth to be consumed of the media stream of the judgment target channel. Then, the channel selection processor 135 calculates a buffering capacity to be consumed due to reception of the stream of the judgment target channel (Step S407).

Figure 7:
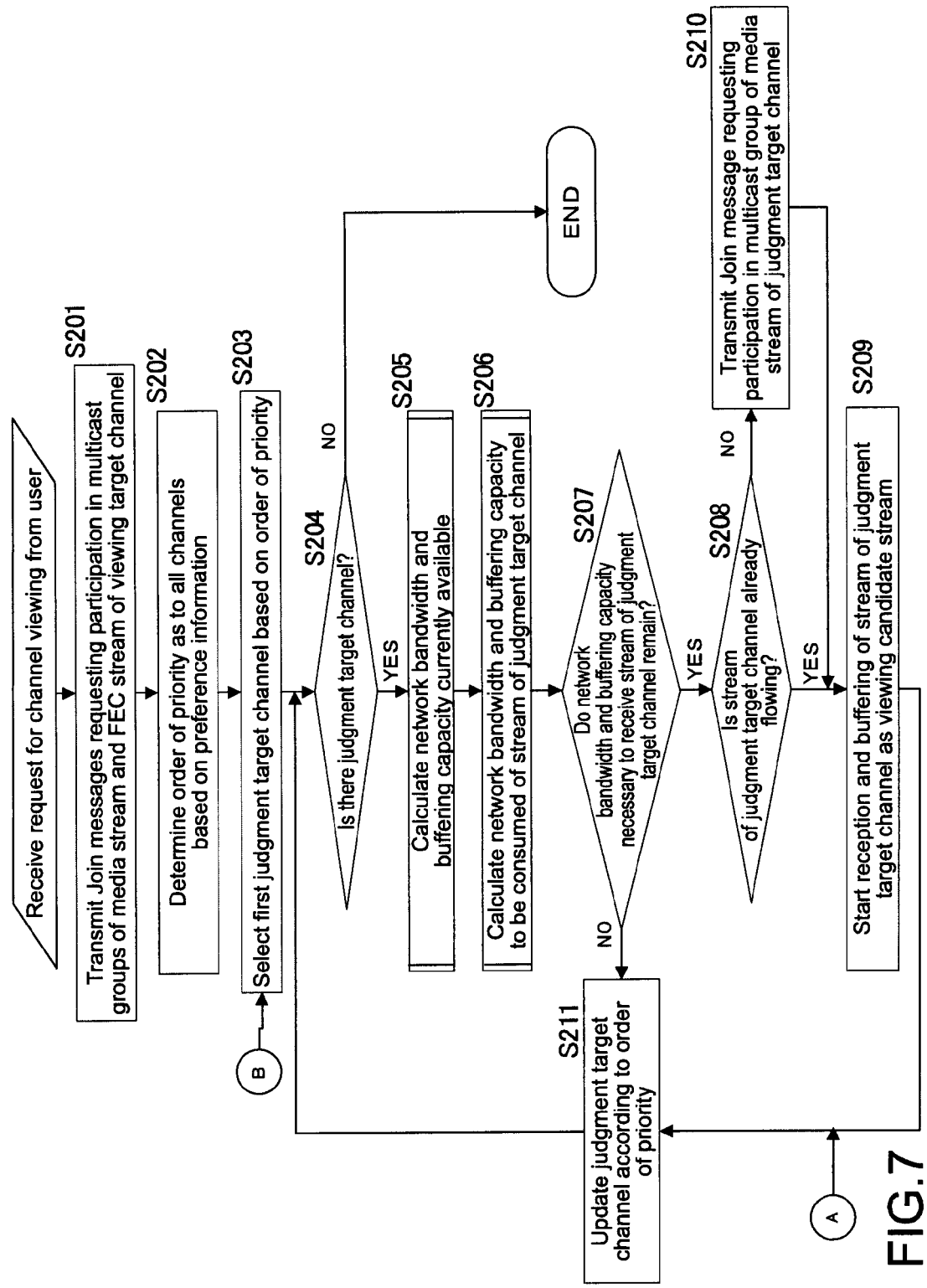
FIG. 7 is a flowchart for describing preprocessing for viewing channel switching.

In a case where the information on the network bandwidth to be consumed of the media stream of the judgment target channel cannot be acquired from the content viewing history, the channel selection processor 135 moves to Step S211 of FIG. 7 and updates the judgment target channel to a next highest priority channel (Step S211). After that, the judgment processing for the updated judgment target channel is repeated in the same manner.

Next, an operation in a case where in the reception apparatus 100, an instruction to switch viewing channels is given by the user will be described.

Figure 10:
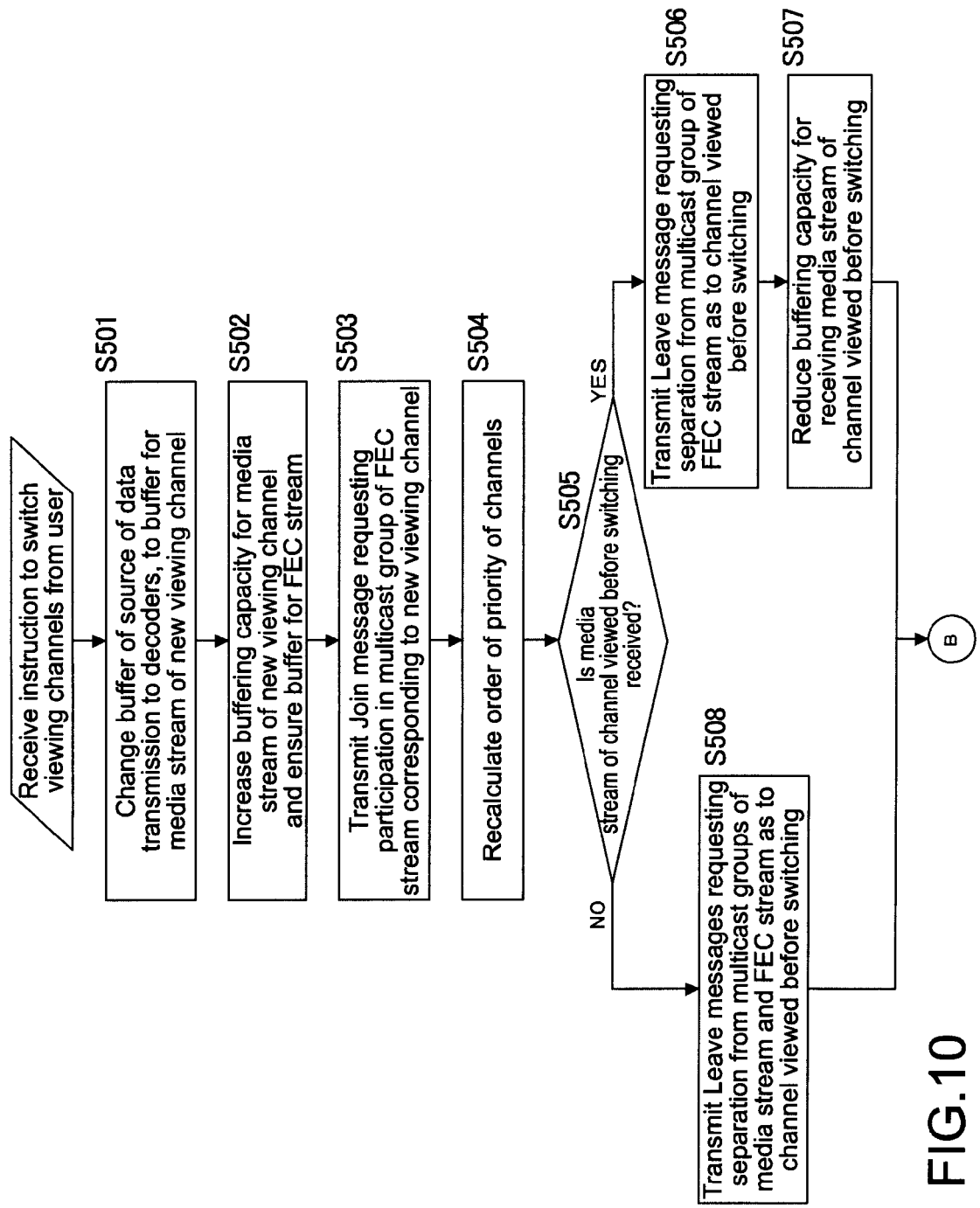
FIG. 10 is a flowchart on a viewing channel switching operation by an instruction of a user.

FIG. 10 is a flowchart on a viewing channel switching operation by an instruction of the user.

First, the user operates the remote controller 151 to input a viewing channel switching instruction containing information of a channel newly selected. The instruction from the remote controller 151 is received by the remote-controller interface 106 and notified to the channel selection processor 135 in the AV player 130.

Upon receiving the viewing channel switching instruction, the channel selection processor 135 changes a buffer of a source of data transmission to the video decoder 131, the audio decoder 132, and the subtitle decoder 133, from a buffer for the media stream of the channel being viewed until that moment to a buffer for a media stream of the channel newly selected (Step S501). Hereinafter, the channel newly selected is referred to as "new viewing channel". A capacity of a buffer for viewing candidate stream is set to a value at which reproduction of a video and an audio obtained immediately after the viewing channels are switched is ensured. Accordingly, by only waiting for a short period of time required for reproduction processing such as decoding of a media stream, it is possible to switch viewing channels from the standpoint of the user and enhance use efficiency of the buffering capacity.

After that, a buffering capacity for a media stream of a new viewing channel is increased to a size for viewing, and a buffer for an FEC stream corresponding to the media stream is also ensured (Step S502). In this case, the size for viewing is a size determined so that a buffer underflow derived from fluctuations of a data transmission rate on the network is prevented from occurring.

Then, the channel selection processor 135 extracts a multicast address of the FEC stream corresponding to the new viewing channel from the SI stored in the SI storage section 73. The channel selection processor 135 then requests the communication processor 110 to transmit a Join message for requesting participation in a multicast group corresponding to the multicast address of the FEC stream (Step S503).

In response to the request, the communication processor 110 transmits the Join message to the router 14. When receiving the Join message transmitted from the reception apparatus 100, the router 14 registers the IP address of the reception apparatus 100 in the IGMP table in association with an address of the multicast group. From here on, in accordance with the information registered in the IGMP table, the router 14 performs routing, to the reception apparatus 100, of the relevant FEC stream delivered from the delivery server. Accordingly, reception and buffering of the FEC stream is started in the reception apparatus 100.

Next, the viewing history record section 74 extracts information on a content of the new viewing channel, such as a channel, a title, a genre, a performer, and a broadcast time, from the SI stored in the SI storage section 73 and adds the extracted information as a viewing history to the viewing history storage section 71. Based on the viewing history stored in the viewing history storage section 71, the channel selection processor 135 generates preference information of the user and replaces the contents of the preference information storage section 72 with the preference information newly generated. Subsequently, the channel selection processor 135 recalculates an order of priority with respect to all channels that are delivering contents based on the user's preference information stored in the preference information storage section 72 (Step S504).

At the present moment, a media stream and an FEC stream of a channel that has been viewed until immediately before the channels are switched are still being received and buffered by the reception apparatus 100. The channel selection processor 135 then judges whether to continue buffering the media stream of the channel viewed before the switching, as a viewing candidate stream, based on the recalculated order of priority of channels (Step S505). Here, if the priority of the channel viewed before the switching is low, it is considered that there is low probability that the user will select the channel for viewing in the near future again. Thus, when the channel viewed before the switching has a priority falling from a highest priority to an n-th priority, the channel selection processor 135 determines that the media stream of the channel will be buffered as a viewing candidate stream hereafter. Further, when the channel viewed before the switching has a priority falling below the n-th priority, the channel selection processor 135 determines that the media stream of the channel will not be received. Here, n may be a fixed value or a value set by the user.

In a case where the channel selection processor 135 determines to buffer the stream of the channel that has been viewed until immediately before the switching as a viewing candidate stream, the channel selection processor 135 extracts a multicast address of the FEC stream corresponding to the channel from the SI. The channel selection processor 135 requests the communication processor 110 to transmit a Leave message for requesting separation from a multicast group corresponding to the extracted multicast address of the FEC stream. In response to the request, the communication processor 110 transmits the Leave message to the router 14 (Step S506). Upon receiving the Leave message transmitted from the reception apparatus 100, the router 14 deletes the IP address of the reception apparatus 100 from the IGMP table, the IP address being registered in association with the multicast address of the FEC stream.

After that, the channel selection processor 135 eliminates the buffer for receiving the FEC stream of the channel viewed before the switching, and reduces the buffering capacity for receiving the media stream of the channel viewed before the switching to a capacity necessary as a viewing candidate stream (Step S507).

Accordingly, from here on, the reception apparatus 100 does not receive the FEC stream of the channel viewed before the switching but receives only the media stream thereof. In other words, from here on, the reception apparatus 100 receives and buffers the media stream of the channel viewed before the switching as a viewing candidate stream.

As a result, because an unused portion of the network bandwidth and a free space of the buffering capacity that are available for the reception apparatus 100 are increased, the channel selection processor 135 moves to Step S203 of FIG. 7. Accordingly, processing for judging in a descending order of priority whether to receive streams other than the stream of the new viewing channel and the viewing candidate stream as viewing candidate streams is performed.

Further, in Step S505, in a case where the channel selection processor 135 determines not to buffer the stream of the channel viewed before the switching as a viewing candidate stream, the channel selection processor 135 performs the following operation. The channel selection processor 135 extracts, from the SI, the multicast address of the media stream and the multicast address of the FEC stream that correspond to the channel viewed before the switching. The reception apparatus 100 transmits to the router 14 two Leave messages for requesting separation from the multicast groups corresponding to the respective streams (Step S508). When the router 14 receives the two Leave messages transmitted from the reception apparatus 100, the router 14 deletes the IP address of the reception apparatus 100 from the IGMP table, the IP address being registered in association with the addresses of the respective multicast groups. Accordingly, the reception apparatus 100 will not receive the media stream and the FEC stream of the channel viewed before the switching.

Since the unused portion of the network bandwidth and the free space of the buffering capacity that are available for the reception apparatus 100 are also increased in this case, the channel selection processor 135 moves to Step S203 of FIG. 7 in order to try to set a new viewing candidate stream. Accordingly, processing for judging in a descending order of priority whether to receive streams other than the stream of the new viewing channel and the viewing candidate streams as viewing candidate streams is performed.

As described above, apart from the stream of the channel being viewed, the reception apparatus 100 according to this embodiment receives and buffers a stream or streams of one or more channels as viewing candidate stream(s). In the reception apparatus 100, when the user inputs an instruction to switch over from any one of channels being received as viewing candidate streams to a viewing target channel, the reception apparatus 100 decodes the buffered stream of the relevant channel and starts reproducing it, and at the same time, starts receiving the stream of the relevant channel as a viewing target stream. Accordingly, a time necessary for switching of the viewing channels from the standpoint of the user can be largely received.

Further, in the reception apparatus 100 according to this embodiment, viewing candidate streams of as many channels as possible are received and buffered within a range of resources that the reception apparatus 100 can use in order to receive and buffer streams. Accordingly, it is possible to reduce a time required for viewing channel switching while achieving multichanneling of the multicast streams.

Further, in the reception apparatus 100 according to this embodiment, the order of priority of channels is calculated with reference to the preference of the user and each of the channels is selected in a descending order of priority as a channel to be received as a viewing candidate stream. Accordingly, when the user selects a desired channel that is switched to, a probability that the desired channel is selected from channels that are receiving viewing candidate streams can be made larger.

Further, in the reception apparatus 100 according to this embodiment, the buffering capacity for buffering viewing candidate streams is set to a value at which reproduction of a video and an audio obtained immediately after the viewing channels are switched is ensured. Accordingly, by only waiting for a short period of time required for reproduction processing such as decoding of a media stream, it is possible to switch viewing channels from the standpoint of the user and enhance use efficiency of the buffering capacity.

(Second Embodiment)

Next, a second embodiment of the present invention will be described.

This embodiment relates to a method of dynamically changing the number of channels received in the reception apparatus 100 as viewing candidate streams, depending on deterioration in transmission characteristics of network environments.

Figure 11:
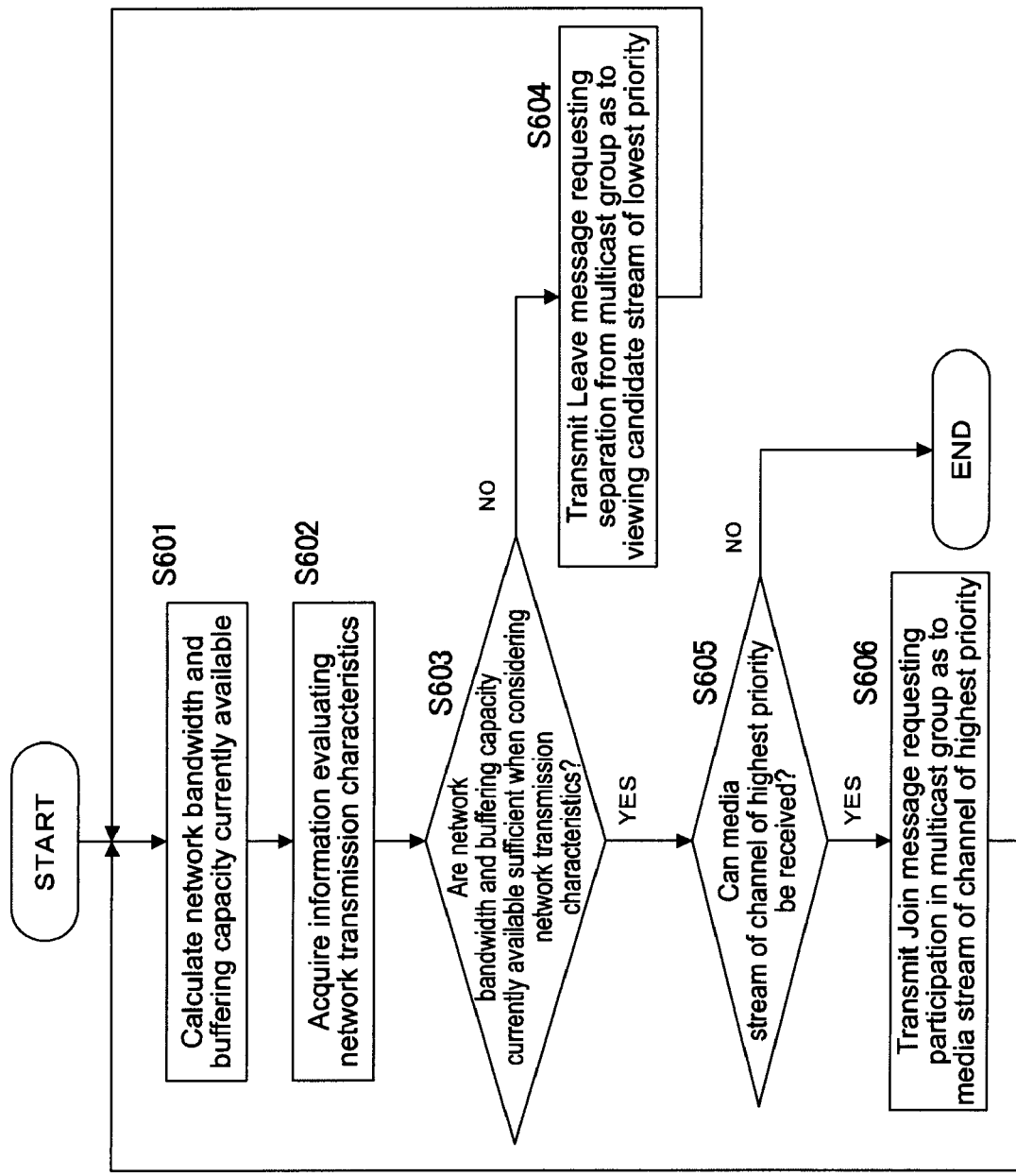
FIG. 11 is a flowchart on processing of dynamically changing the number of receiving channels depending on network transmission characteristics.

FIG. 11 is a flowchart on processing of dynamically changing the number of received channels depending on the network transmission characteristics. For example, the processing may be performed at an arbitrary timing designated by the user or regularly. In a case where the processing is performed regularly, it is efficient to start the processing several minutes before a time at which a switch of delivered contents is made (at x:25, x:55, etc.)

First, the channel selection processor 135 calculates a network bandwidth and a buffering capacity currently available in the reception apparatus 100 (Step S601). Then, the channel selection processor 135 acquires information that evaluates network transmission characteristics, such as an error rate of data before FEC restoration and a packet loss rate according to RTCP (RTP Control Protocol) etc. (Step S602). Here, effective values of the network bandwidth and the buffering capacity currently available become lowered as a degree of the degradation of the network transmission characteristics becomes larger.

Then, the channel selection processor 135 judges whether the values of the network bandwidth and the buffering capacity currently available are sufficient to receive the stream of the viewing channel and the viewing candidate streams even when the degree of degradation of the network transmission characteristics is anticipated (Step S603). More specifically, for example, the channel selection processor 135 subtracts, from the network bandwidth currently available, a value obtained by multiplying the network bandwidth currently available by, for example, an error rate of data before FEC restoration, the error rate being evaluation information of the network transmission characteristics. When the resultant value is negative, it is judged that the network bandwidth currently available is insufficient to receive the stream of the viewing channel and the viewing candidate streams. Conversely, when the resultant value is positive, it is judged that the network bandwidth currently available is sufficient to receive the stream of the viewing channel and the viewing candidate streams. The same judgment is also performed on the buffering capacity currently available.

When any one of the network bandwidth and the buffering capacity currently available is judged to be insufficient in a case where the network transmission characteristics are considered (NO in Step 603), the channel selection processor 135 performs the processing as follows. The channel selection processor 135 stops receiving a viewing candidate stream of a lowest priority out of one or more viewing candidate streams being currently received. In other words, the channel selection processor 135 determines a viewing candidate stream of a lowest priority out of one or more viewing candidate streams being currently received, and requests the communication processor 110 to transmit a Leave message for requesting separation from a multicast group corresponding to the viewing candidate stream. In response to this request, the communication processor 110 transmits the Leave message for requesting separation from the multicast group corresponding to the viewing candidate stream of the lowest priority (Step S604). Accordingly, reception and buffering of the viewing candidate stream of the lowest priority is stopped.

When the network bandwidth and the buffering capacity currently available in a case where the network transmission characteristics are considered are judged to be sufficient (YES in Step 603), the channel selection processor 135 performs the processing as follows. The channel selection processor 135 determines an order of priority regarding contents of channels that are not being received, based on the user's preference information stored in the preference information storage section 72. Next, based on the determination result, the channel selection processor 135 determines a content of a highest priority in the contents of the channels that are not being received. The channel selection processor 135 calculates a network bandwidth and buffering capacity to be consumed due to reception of a media stream of the channel that is delivering the content. The channel selection processor 135 judges whether a network bandwidth and a buffering capacity necessary to receive the media stream of the channel as a viewing candidate stream remain (Step S605).

When judging in this judgment that at least one of the necessary network bandwidth and buffering capacity does not remain, the channel selection processor 135 terminates the processing with do nothing. When judging that the necessary network bandwidth and buffering capacity remain, the channel selection processor 135 requests the communication processor 110 to transmit a Join message for requesting participation in a multicast group corresponding to the media stream of the channel. In response to this request, the communication processor 110 transmits the Join message to the router 14 (Step S606). Accordingly, reception and buffering of the media stream of the channel of the highest priority is started.

As described above, according to the second embodiment, following the fluctuations of the network transmission characteristics, a maximum number of channels receiving streams as viewing candidate streams is optimized. Accordingly, it is possible to prevent that reception of streams of channels, buffering operations, and reproduction of media streams become unstable due to shortage of the network bandwidth and the buffering capacity.

The present application contains subject matter related to that disclosed in Japanese Priority Patent Application JP 2008-262004 filed in the Japan Patent Office on Oct. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus for receiving a stream delivered by multicast through a network, the reception apparatus comprising:
    a communication processor that receives a stream of a first channel for viewing and receives streams of one or more additional channels as viewing candidates;
    a memory that stores the received first channel stream and the received additional channel streams; a reproduction processor that processes the stored first channel stream for viewing; and
    a channel processor that:
        upon receipt of an instruction to switch to a selected one of the additional channels, causes the reproduction processor to process the stored additional channel stream corresponding to the selected additional channel and causes the communication processor to receive the stream of the selected additional channel for viewing;
        prioritizes available channels by calculating an order of priority based on user preference information;
        determines whether there are sufficient resources available to add an available channel from the prioritized available channels as one of the one or more additional channels whose streams are viewing candidates; and
        selects a channel from the prioritized available channels as one of the additional channels in a descending order of priority.

2. The reception apparatus according to claim 1, wherein, when the instruction is received, the channel processor causes the communication processor to receive the stream of the first channel as a viewing candidate or to stop receiving the stream of the first channel.

3. The reception apparatus according to claim 2, wherein the channel processor sets a quantity of the additional channels to be a maximum within a range of resources that the reception apparatus can use to receive and buffer streams.

4. The reception apparatus according to claim 3, wherein the memory includes a capacity allocated for each additional channel stream, and the capacity allocated to each of the additional channel streams is set to a value that ensures that reproduction of a video and an audio are obtained immediately after viewing channels are switched.

5. The reception apparatus according to claim 1, wherein the channel processor causes the communication processor to receive a media stream and an error correction stream for a stream for viewing and to receive only a media stream for a viewing candidate stream.

6. The reception apparatus according to claim 5, wherein the channel processor acquires information for evaluating transmission characteristics of the network and, based on the information, dynamically changes a maximum number of the additional channels.

7. A reception method for receiving a stream delivered by multicast through a network, the reception method comprising:
    receiving a stream of a first channel for viewing and receiving streams of one or more additional channels as viewing candidates; storing the received first channel stream and the received additional channel streams in a buffer;
    upon receipt of an instruction to switch to a selected one of the additional channels, reproducing the stored additional channel stream corresponding to the selected additional channel, and receiving the stream of the selected additional channel for viewing;
    prioritizing available channels by calculating an order of priority based on user preference information;
    determining whether there are sufficient resources available to add an available channel from the prioritized available channels as one of the one or more additional channels whose streams are viewing candidates; and
    selecting a channel from the prioritized available channels as one of the additional channels in a descending order of priority.

8. A non-transitory computer-readable medium storing a computer program that, when executed by a processor, causes a computer to perform the steps of:
    receiving a stream of a first channel for viewing and receiving streams of one or more additional channels as viewing candidates;
    storing the received first channel stream and the received additional channel streams;
    processing the stored first channel stream for viewing;
    upon receipt of an instruction to switch to a selected one of the additional channels, processing the stored additional channel stream corresponding to the selected additional channel, and causing the stream of the selected additional channel to be received for viewing;
    prioritizing available channels by calculating an order of priority based on user preference information; determining whether there are sufficient resources available to add an available channel from the prioritized available channels as one of the one or more additional channels whose streams are viewing candidates; and selecting a channel from the prioritized available channels as one of the additional channels in a descending order of priority.

9. The method of claim 7, further comprising, when the instruction is received, receiving the stream of the first channel as a viewing candidate or stopping the receiving of the stream of the first channel.

10. The method of claim 9, further comprising setting a quantity of the additional channels to be a maximum within a range of resources that the reception apparatus can use to receive and buffer streams.

11. The method of claim 10, wherein the buffer includes a capacity allocated for each additional channel stream, and the capacity allocated for each of the additional channel streams is set to a value that ensures that reproduction of a video and an audio are obtained immediately after viewing channels are switched.

12. The method of claim 7, further comprising receiving a media stream and an error correction stream for a stream for viewing and receiving only a media stream for a viewing candidate stream.

13. The method of claim 12, further comprising acquiring information for evaluating transmission characteristics of the network and, based on the information, dynamically changing a maximum number of the additional channels.

14. The non-transitory computer-readable medium of claim 8, further comprising, when the instruction is received, receiving the stream of the first channel as a viewing candidate or stopping the receiving of the stream of the first channel.

15. The non-transitory computer-readable medium of claim 14, further comprising setting a quantity of the additional channels to be a maximum within a range of resources that the reception apparatus can use to receive and buffer streams.

16. The non-transitory computer-readable medium of claim 15, wherein:
- the received first channel stream and the received additional channel streams are stored in a buffer;
- the buffer includes a capacity allocated for each additional channel stream; and
- the capacity allocated for each of the additional channel streams is set to a value that ensures that reproduction of a video and an audio are obtained immediately after viewing channels are switched.

17. The non-transitory computer-readable medium of claim 8, further comprising receiving a media stream and an error correction stream for viewing and receiving only a media stream for a viewing candidate stream.

18. The non-transitory computer-readable medium of claim 17, further comprising acquiring information for evaluating transmission characteristics of the network and, based on the information, dynamically changing a maximum number of the additional channels.

* * * * *